United States Patent
Johnson et al.

(10) Patent No.: US 7,500,108 B2
(45) Date of Patent: Mar. 3, 2009

(54) METERED EXECUTION OF CODE

(75) Inventors: Bruce E. Johnson, Bellevue, WA (US);
Seth M. Demsey, Kirkland, WA (US);
William Michael Zintel, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 624 days.

(21) Appl. No.: 10/791,208

(22) Filed: Mar. 1, 2004

(65) Prior Publication Data

US 2005/0193213 A1    Sep. 1, 2005

(51) Int. Cl.
*H04L 9/32* (2006.01)
(52) U.S. Cl. .................. 713/187; 713/185; 713/189; 713/190; 726/26; 714/38
(58) Field of Classification Search ............ 713/187, 713/189, 185, 190; 726/26
See application file for complete search history.

(56) References Cited

U.S. PATENT DOCUMENTS

| | | |
|---|---|---|
| 4,941,175 A | 7/1990 | Enescu et al. |
| 4,953,209 A | 8/1990 | Ryder, Sr. et al. |
| 5,319,705 A | 6/1994 | Halter et al. |
| 5,450,593 A | 9/1995 | Howell et al. |
| 5,652,868 A | 7/1997 | Williams |
| 5,673,315 A | 9/1997 | Wolf |
| 5,673,317 A | 9/1997 | Cooper |
| 5,745,678 A | 4/1998 | Herzberg et al. |
| 5,752,041 A | 5/1998 | Fosdick |
| 5,754,763 A | 5/1998 | Bereiter |
| 5,757,908 A | 5/1998 | Cooper et al. |
| 5,758,068 A | 5/1998 | Brandt et al. |
| 5,771,347 A | 6/1998 | Grantz et al. |
| 5,933,497 A | 8/1999 | Beetcher et al. |
| 5,970,145 A * | 10/1999 | McManis .................... 713/187 |
| 6,049,875 A | 4/2000 | Suzuki et al. |
| 6,070,239 A | 5/2000 | McManis |
| 6,078,909 A | 6/2000 | Knutson |
| 6,112,192 A | 8/2000 | Capek |
| 6,134,659 A | 10/2000 | Sprong et al. |
| 6,138,238 A | 10/2000 | Scheifler et al. |
| 6,141,754 A | 10/2000 | Choy |
| 6,199,204 B1 | 3/2001 | Donohue |
| 6,202,207 B1 | 3/2001 | Donohue |
| 6,226,618 B1 | 5/2001 | Downs et al. |
| 6,237,023 B1 | 5/2001 | Yoshimoto |
| 6,253,370 B1 | 6/2001 | Abadi et al. |
| 6,314,409 B2 * | 11/2001 | Schneck et al. .............. 705/54 |
| 6,389,540 B1 * | 5/2002 | Scheifler et al. .............. 726/21 |
| 6,463,538 B1 | 10/2002 | Elteto |
| 6,546,487 B1 * | 4/2003 | McManis .................... 713/169 |
| 6,574,612 B1 | 6/2003 | Baratti et al. |

(Continued)

FOREIGN PATENT DOCUMENTS

EP       0715246       6/1996

(Continued)

*Primary Examiner*—Kambiz Zand
*Assistant Examiner*—Amare Tabor
(74) *Attorney, Agent, or Firm*—Lee & Hayes, PLLC

(57) ABSTRACT

Systems and methods for metering execution of code at runtime are described. According to one implementation, a call is received requesting execution of a protected service. In response, permission is requested for the execution. The request for permission is analyzed. A grant of permission is based on the analysis.

33 Claims, 4 Drawing Sheets

U.S. PATENT DOCUMENTS

| | | | |
|---|---|---|---|
| 6,587,947 | B1 | 7/2003 | O'Donnell et al. |
| 6,611,812 | B2 | 8/2003 | Hurtado et al. |
| 6,842,862 | B2 * | 1/2005 | Chow et al. ................ 713/190 |
| 7,203,833 | B1 * | 4/2007 | Abadi et al. ................ 713/167 |
| 2001/0005888 | A1 | 6/2001 | Abdelkrim |
| 2001/0025347 | A1 | 9/2001 | Thomas |
| 2001/0034839 | A1 | 10/2001 | Karjoth |
| 2001/0042209 | A1 | 11/2001 | Sato |
| 2001/0047477 | A1 | 11/2001 | Chiang |
| 2001/0056547 | A1 | 12/2001 | Dixon |
| 2002/0016918 | A1 | 2/2002 | Tucker et al. |
| 2002/0038428 | A1 | 3/2002 | Safa |
| 2002/0062448 | A1 | 5/2002 | Kayahara |
| 2002/0116635 | A1 | 8/2002 | Sheymov |
| 2002/0144124 | A1 | 10/2002 | Remer et al. |
| 2002/0184522 | A1 | 12/2002 | Buhr et al. |
| 2003/0084324 | A1 | 5/2003 | Koved et al. |
| 2003/0084325 | A1 | 5/2003 | Koved et al. |
| 2003/0135741 | A1 * | 7/2003 | Nuriyev ...................... 713/187 |
| 2003/0200267 | A1 | 10/2003 | Garrigues |
| 2003/0217277 | A1 | 11/2003 | Narayanan |

FOREIGN PATENT DOCUMENTS

| | | |
|---|---|---|
| WO | WO9311480 | 6/1993 |
| WO | WO03038570 | 5/2003 |

* cited by examiner

METERED EXECUTION OF CODE

TECHNICAL FIELD

The present disclosure generally relates to the metered execution of code.

BACKGROUND

Digital rights management has focused extensively on protection of "content," such as music, motion pictures and other copyrighted data-based material. In particular, research has been made into various encryption strategies which could be employed to protect such material from copying and other uses which violate licensing agreements between content-providers and content-consumers.

Executable software code has traditionally followed a different model, wherein a consumer makes a software purchase (either "shrink-wrapped" or down-loaded), installs the software on a computer system and consents to a licensing agreement. At this point, conventional systems and methods allow the consumer to execute any part of the code contained within the software purchase to any degree desired (consistent with the licensing agreement, which typically prescribes the number of machines on which the software may be installed).

The current licensing model for executable software described above provides the consumer with an "all or nothing" choice when making a software purchasing decision—i.e. to incur the full cost and benefit, or to entirely forego the cost and the benefit. Thus, the purchasing analysis typically involves a decision as to whether the consumer anticipates exceeding a threshold level of use. If so, a purchase is made; if not, no purchase is made. In some situations, this model can be unsatisfactory for software producers, since sales are lost where consumers decline to make purchases when they anticipate that their use of a software product will be low. This model is similarly unsatisfactory for consumers, since they may inaccurately estimate need for a software product. Such a miscalculation may result in either a little-used purchase or unfilled needs which were greater than anticipated. Moreover, even where the consumer correctly estimates that use will be small and forgoes the purchase, there is dissatisfaction because consumers have unmet needs for software products.

Accordingly, a need exists for alternative techniques to license operation of software code.

SUMMARY

Systems and methods for metering execution of code at runtime are described. According to one implementation, a call is received requesting execution of a protected service. In response, permission is requested for the execution. The request for permission is analyzed. A grant of permission is based on the analysis.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical items.

DETAILED DESCRIPTION

Overview

The following discussion is directed to systems and methods that meter execution of code. Such systems and methods are adaptable to any code-executing device, such as computer systems, cellular telephones and many others. According to one implementation, an application—or plurality of applications organized as a library—is configured to make calls to invoke operation of one or more protected services, which may also be configured as a library. The protected services can represent executable code whose operation and functionality is desired to be controlled, such as for reasons related to billing, software licensing, security, child-protection, or other purposes. Because execution of each protected service may be separately controlled, licensing of executable code may be made "granular," i.e. small functional blocks of executable code may be licensed, thereby providing an alternative to licensing larger blocks of code. This can provide a valuable sales tool for utilization by vendors, since such a tool will allow consumers to license only the code that they wish to execute.

Upon being called by an application, a protected service calls upon a metering engine to perform an analysis determining whether the application which called the protected service has permission to do so. Permission is typically governed by a service contract, evaluated in view of meter data. For example, the service contract may allow a certain number of calls by the application to the protected service, perhaps as a function of time. In this case, a history of prior calls to the protected service, and perhaps times of the prior calls, would be contained in the meter data. The analysis of the service contract and meter data by the metering engine results in a determination of allowance or rejection of the application's request for execution of the protected service. The protected service then executes if allowed, and returns a result to the application.

Exemplary Apparatus

Figure 1:
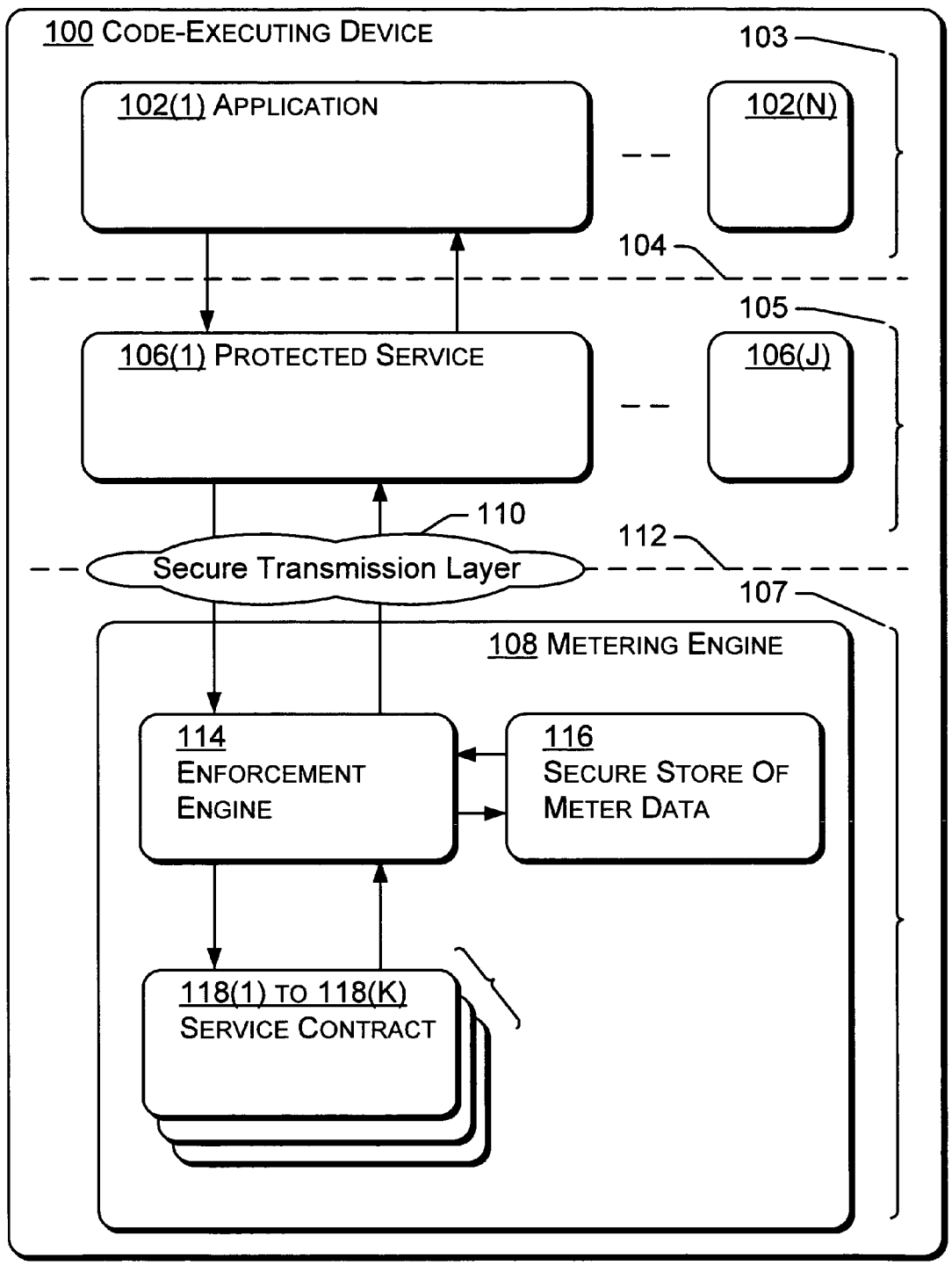
FIG. 1 illustrates an example of a code-executing device, within which are shown an exemplary application or application library, a plurality of protected services and a metering engine.

FIG. 1 illustrates an example of a code-executing device 100, which may be a computer system, cellular telephone, PDA, entertainment device (e.g., set-top box, cable box, digital audio player, DVD, etc.) or other device capable of executing software. An application 102 or library of applications 102(1) to 102(N) are configured to run on the device 100. The application(s) can be any type of software. Examples of possible applications include office productivity software configured to run on a workstation or a text-messaging application configured to run on a cellular telephone. An exemplary library of applications 102(1) to 102(N) may include, for example, of a plurality of functional blocks associated with a larger program, such as an office productivity suite.

The application(s) 102 are configured to make calls to one or more protected services 106(1) through 106(J). The protected services are "protected" in that they are subject to metered code execution, as will be developed more fully, below. The protected services are executable software routines, which may be configured for almost any purpose. For example, where the code-executing device 100 is a cellular telephone, the protected services may support features whose operation is to be metered. In such an environment, the protected services may support features such as sending a text message, facilitating call-forwarding set-up or other functionality for which metered execution is desired. In an alternative example, where the code-executing device 100 is a workstation, the protected services may support enhanced features of an office productivity suite whose operation is to be metered. In such an environment, the protected services may support features which may or may not be frequently used. For example, protected services may support features such as the creation of pdf files, the operation of a foreign spell-checker or other functionality for which metered execution is desired.

Each protected service 106 is configured, upon being called by an application 102, to call a metering engine 108. The metering engine 108 makes a determination if the application 102 or immediate caller (which may be located, for example, in a stack) has permission to execute the protected service 106. The call from the protected service 106 to the metering engine 108 is typically made using a secure transmission layer 110. The secure transmission layer may utilize strong cryptography, a secure socket or any conventional or newly-developed strategy for secure communication.

Note that in one implementation, the applications 102 and protected services 106 may be located in a single runtime area. Alternatively, the applications 102 and protected services 106 may be run in separate runtime areas 103, 105, respectively, wherein memory located in each runtime area is bounded at 104. Similarly, while the metering engine 108 can be run in a separate runtime area 107 within memory bounded at 112 or in a separate machine or device, the metering engine 108 can in some implementations be run in the same runtime area as the application(s) 102 and/or protected service(s) 106.

Structures within a typical metering engine 108 are seen in FIG. 1. An enforcement engine 114 is configured to communicate in a secure manner with a protected service 106 which was called by an application 102 when requesting permission to execute. The enforcement engine 114 is additionally configured to communicate with a secure store of meter data 116 and with one or more service contracts 118(1)-118(K).

The secure store of meter data 116 is configured to contain data relevant to the use of one or more protected services. For example, the meter data 116 may include information on total number of times that any protected service has been called, the applications making each call, and the times of the call. Such data would be useful, for example, where the code-executing device 100 is a cellular telephone, and where the protected service 106 at issue may be configured for providing text-messaging services. In this example, the meter data 116 might include information on the number and times of past text-messages. This information would be useful in many circumstances in determining if additional executions of a protected service 106 are allowable.

One or more service contracts 118(1)-118(K) can be included within the metering engine 108. A service contract 118 includes rules governing the use of one or more protected services 106. For example, rules within the service contract 118 may indicate a maximum number of times a protected service 106 may be executed, or a maximum number of times such a service may be executed within a period of time. Alternatively, rules within the service contract 118 may impose a date after which execution of the protected service is no longer allowed. As will be easily understood by the reader, rules of any number and type may be contained within the service contract.

There may be one or multiple service contracts 118 depending upon the implementation. In an implementation where the metering engine 108 is configured within a cellular telephone, there might be a single service contract 118 to govern one or more protected services. In another implementation where the metering engine 108 is configured for use with a computer, there may be multiple service contracts 118(1)-118(K) to provide rules governing execution of a more complex set of protected services 106(1)-106(J).

FIG. 1 may be interpreted with or without one or more of the separate runtime areas 103, 105, 107 bounded by 104, 112. In one embodiment, one or more of the application 102, protected service 106 and metering engine 108 may operate in separate runtime environments, such as by using areas of memory 103, 105, 107 that are protected. In an alternative embodiment, one or more protected runtime environments 103, 105, 107 may be merged. Moreover, some or all of the software 102, 106 and 108 may be part of, and contained within, a managed code environment. An example of a managed code environment is the .NET software technologies from Microsoft Corporation.

Figure 2:
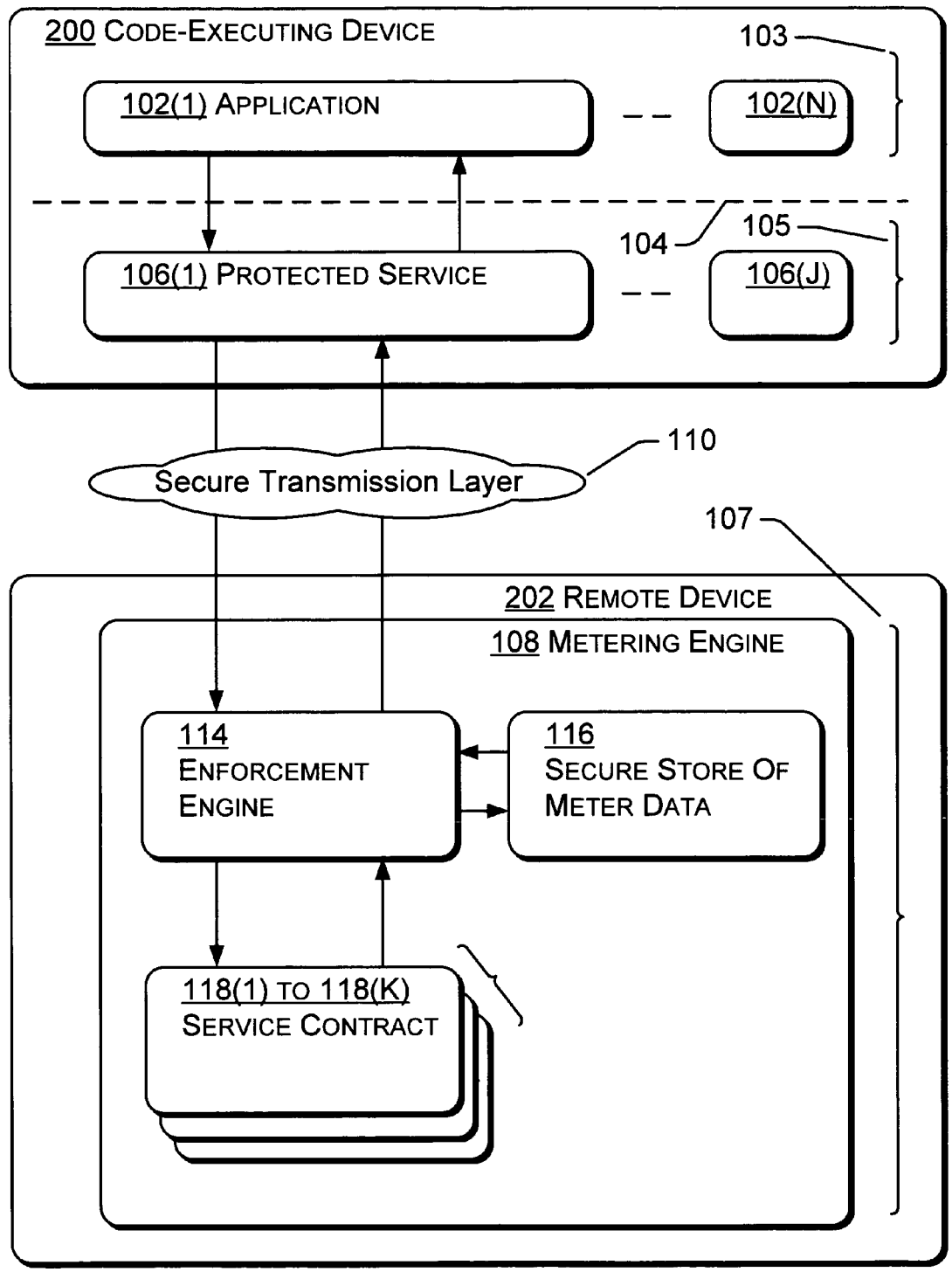
FIG. 2 illustrates a second example of a code-executing device, wherein a compound structure separates the code-executing device from the metering engine.

The code-executing device 100 of FIG. 1 may be monolithic, as shown, and therefore contain the metering engine 108. Alternatively, the code-executing device may be compound, as seen in FIG. 2. In the implementation of FIG. 2, a code-executing device 200 communicates with a remotely located device 202 containing a metering engine 108. In this example, communication between the code-executing device 200 and the metering engine 108 may be made over the Internet or by other systems and methods, as desired.

Exemplary Methods

Figure 3:
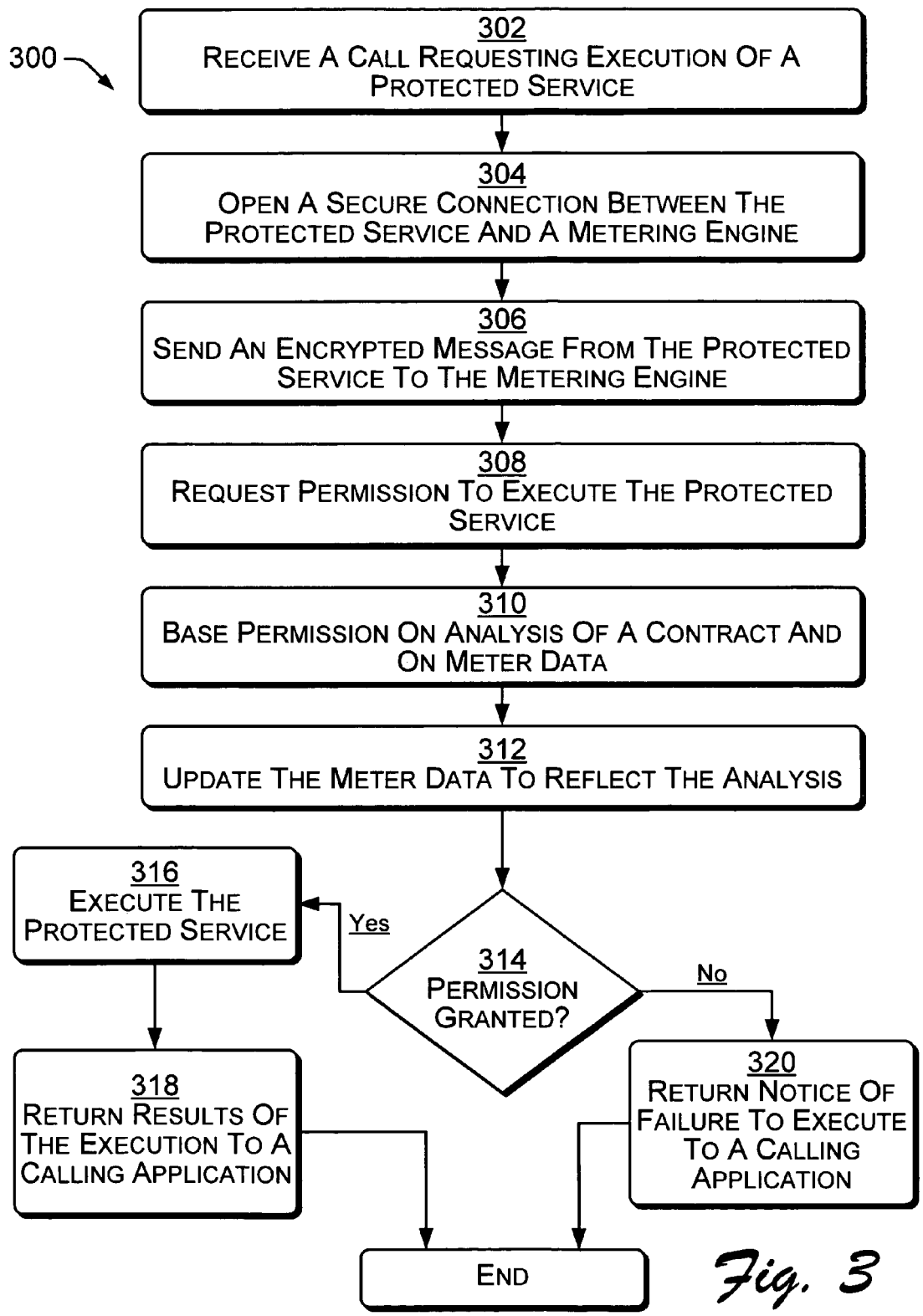
FIG. 3 is a flow diagram that describes an exemplary implementation of metered code execution, particularly showing a method for metering execution of protected services.

FIG. 3 is a flow diagram that describes an exemplary process 300 for metering execution of protected services. The elements of the described process may be performed by any appropriate means including, for example, hardware logic blocks on an ASIC or by the execution of processor-readable instructions defined on a processor-readable medium.

A "processor-readable medium," as used herein, can be any means that can contain, store, communicate, propagate, or transport instructions for use by or execution by a processor. A processor-readable medium can be an electronic, magnetic or optical, device, or similar. More specific examples of a processor-readable medium include, among others, an electrical connection having one or more wires, a portable computer diskette, a random access memory (RAM), a read-only memory (ROM), an erasable programmable-read-only memory (EPROM or Flash memory), an optical fiber, a rewritable compact disc (CD-RW), and a portable compact disc read-only memory (CDROM).

Referring again to FIG. 3, the process 300 can be implemented in many different computing environments, but will be explained for discussion purposes with respect to the code-executing device 100 of FIG. 1. At block 302, an application 102 determines that there is a need for functionality contained within one or more protected services 106. Accordingly, the application makes a call requesting execution of the protected service, which is received by a protected service 106.

At block 304, a secure connection or communication channel is typically opened between the protected service 106 and the metering engine 108. As discussed, the metering engine 108 may be contained on the same code-executing device 100 as the protected service 106. Alternatively, the metering engine may be remotely located. If this is the case, the secure communication channel may be made over the Internet or other network.

At block 306, a message is sent from the protected service to the metering engine. Where a secure connection or channel was opened at block 304, encryption is typically not required. However, where a secure connection or channel was not available, the message is typically encrypted, such as by application of the Pretty Good Privacy® encryption method or other encryption methods. At block 308, the message requesting permission to execute a protected service is received by the metering engine.

At block 310, permission to use the protected service is determined by a metering engine 108 based on an analysis of a service contract 118 and data obtained from a secure store of meter data 116. The service contract contains one or more rules governing the operation of the protected service 106. Examples of rules include restrictions on use of the protected service more than a set number of times, or use of the protected service past a certain date. A wide variety of rules could similarly be envisioned.

In making the decision to allow or reject use of the protected service, the metering engine 108 typically accesses the secure store of meter data 116, which provides information to which the rules contained within the service contract 118 may be applied. At block 312, the meter data 116 is updated to reflect the call made by the protected service. For example, where the rules within the service contract 118 specify an allowable number of executions of the protected service, the meter data 116 is updated to reflect an addition execution of the protected service.

At block 314, where the analysis by the metering engine indicates that permission to execute the protected service is appropriately granted, an allowance code is issued by the metering engine; alternatively, a rejection code may be issued. Accordingly, the protected service 106 is executed (block 316). At block 318, the protected service is then able to return results of its operation to the calling application 102.

Alternatively, where the analysis by the metering engine results in rejection of use of the protected service, the protected service directed to return notice of failure to execute to the calling application 102 (block 320).

While one or more methods have been disclosed by means of flow diagrams and text associated with the blocks of the flow diagrams, it is to be understood that the blocks do not necessarily have to be performed in the order in which they were presented, and that an alternative order may result in similar advantages. Furthermore, the methods are not exclusive and can be performed alone or in combination with one another.

Exemplary Code-Executing Device

Figure 4:
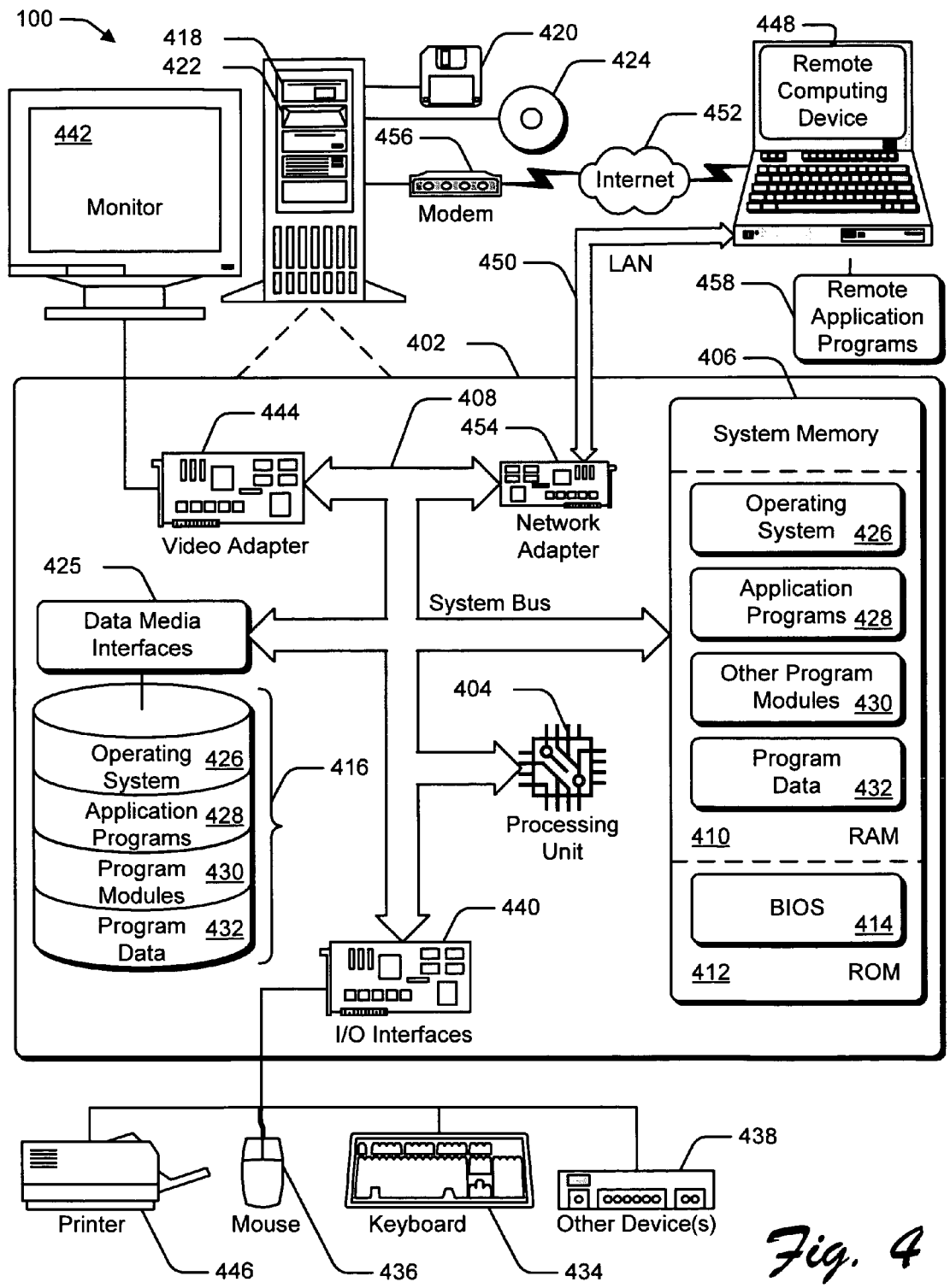
FIG. 4 is an exemplary code-executing device wherein metered execution of code may be implemented.

FIG. 4 is an example of a code-executing system 100 wherein metered execution of code may be implemented. Any type of code-executing device may utilize metered execution of code; however for purposes of the example of FIG. 4, the code-executing system 100 has been configured as a computer workstation wherein code execution may be metered.

The code-executing system 100 includes a general-purpose computing system in the form of a computer 402. The components of computer 402 can include, but are not limited to, one or more processors or processing units 404, a system memory 406, and a system bus 408 that couples various system components including the processor 404 to the system memory 406. The system bus 408 represents one or more of any of several types of bus structures, including a memory bus or memory controller, a peripheral bus, a Peripheral Component Interconnect (PCI) bus, an accelerated graphics port, and a processor or local bus using any of a variety of bus architectures.

Computer 402 typically includes a variety of computer readable media. Such media can be any available media that is accessible by computer 402 and includes both volatile and non-volatile media, removable and non-removable media. The system memory 406 includes computer readable media in the form of volatile memory, such as random access memory (RAM) 410, and/or non-volatile memory, such as read only memory (ROM) 412. A basic input/output system (BIOS) 414, containing the basic routines that help to transfer information between elements within computer 402, such as during start-up, is stored in ROM 412. RAM 410 typically contains data and/or program modules that are immediately accessible to and/or presently operated on by the processing unit 404.

Computer 402 can also include other removable/non-removable, volatile/non-volatile computer storage media. By way of example, FIG. 4 illustrates a hard disk drive 416 for reading from and writing to a non-removable, non-volatile magnetic media (not shown), a magnetic disk drive 418 for reading from and writing to a removable, non-volatile magnetic disk 420 (e.g., a "floppy disk"), and an optical disk drive 422 for reading from and/or writing to a removable, non-volatile optical disk 424 such as a CD-ROM, DVD-ROM, or other optical media. The hard disk drive 416, magnetic disk drive 418, and optical disk drive 422 are each connected to the system bus 408 by one or more data media interfaces 425. Alternatively, the hard disk drive 416, magnetic disk drive 418, and optical disk drive 422 can be connected to the system bus 408 by a SCSI interface (not shown).

The disk drives and their associated computer-readable media provide non-volatile storage of computer readable instructions, data structures, program modules, and other data for computer 402. Although the example illustrates a hard disk 416, a removable magnetic disk 420, and a removable optical disk 424, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 416, magnetic disk 420, optical disk 424, ROM 412, and/or RAM 410, including by way of example, an operating system 426, one or more application programs 428, other program modules 430, and program data 432. Each of such operating system 426, one or more application programs 428, other program modules 430, and program data 432 (or some combination thereof) may include an embodiment of a caching scheme for user network access information.

Computer 402 can include a variety of computer/processor readable media identified as communication media. Communication media typically embodies computer readable instructions, data structures, program modules, or other data in an information delivery media.

A user can enter commands and information into computer system 402 via input devices such as a keyboard 434 and a pointing device 436 (e.g., a "mouse"). Other input devices 438 (not shown specifically) may include a microphone, joystick, game pad, satellite dish, serial port, scanner, and/or the like. These and other input devices are connected to the processing unit 404 via input/output interfaces 440 that are coupled to the system bus 408, but may be connected by other interface and bus structures, such as a parallel port, game port, or a universal serial bus (USB).

A monitor 442 or other type of display device can also be connected to the system bus 408 via an interface, such as a video adapter 444. In addition to the monitor 442, other output peripheral devices can include components such as speakers (not shown) and a printer 446 which can be connected to computer 402 via the input/output interfaces 440.

Computer 402 can operate in a networked environment using logical connections to one or more remote computers, such as a remote computing device 448. By way of example, the remote computing device 448 can be a personal computer, portable computer, a server, a router, a network computer, a peer device or other common network node, and the like. The remote computing device 448 is illustrated as a portable computer that can include many or all of the elements and features described herein relative to computer system 402.

Logical connections between computer 402 and the remote computer 448 are depicted as a local area network (LAN) 450 and a general wide area network (WAN) 452. Such networking environments are commonplace in offices, enterprise-wide computer networks, intranets, and the Internet. When implemented in a LAN networking environment, the computer 402 is connected to a local network 450 via a network interface or adapter 454. When implemented in a WAN networking environment, the computer 402 typically includes a modem 456 or other means for establishing communications over the wide network 452. The modem 456, which can be internal or external to computer 402, can be connected to the system bus 408 via the input/output interfaces 440 or other appropriate mechanisms. It is to be appreciated that the illustrated network connections are exemplary and that other means of establishing communication link(s) between the computers 402 and 448 can be employed.

In a networked environment, such as that illustrated with computing environment 400, program modules depicted relative to the computer 402, or portions thereof, may be stored in a remote memory storage device. By way of example, remote application programs 458 reside on a memory device of remote computer 448. For purposes of illustration, application programs and other executable program components, such as the operating system, are illustrated herein as discrete blocks, although it is recognized that such programs and components reside at various times in different storage components of the computer system 402, and are executed by the data processor(s) of the computer.

CONCLUSION

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

The invention claimed is:

1. A computer readable medium, comprising instructions for metering execution of code, the instructions comprising:
receiving, at a protected service, a call from an application asking for execution of the protected service within a first runtime area;
requesting permission for the execution, wherein the request is made by the protected service to a metering engine operating in a second runtime area, wherein the request is made through a secure transmission layer; and
analyzing the request, at the metering engine, wherein the analyzing comprises:
referencing, within the metering engine, a service contract comprising rules governing operation of the protected service;
referencing, within the metering engine, a secure store of meter data, wherein the meter data comprises historical data reflecting past operation of the protected service;
using the rules and the meter data to decide the requested permission; and
updating the metering data to reflect the analysis.

2. The computer readable medium of claim 1, wherein the service contract is selected from among multiple service contracts.

3. The computer readable medium of claim 1, wherein the first and second runtime areas reside in different partitions of memory.

4. The computer readable medium of claim 1, wherein the first runtime area is located at a first computing device and the second runtime area is located at a second computing device.

5. The computer readable medium of claim 1, wherein the meter data comprises a number of times a protected service has been called.

6. The computer readable medium of claim 5, wherein the meter data contains information relevant to more than one protected service.

7. The computer readable medium of claim 1, wherein requesting permission comprises opening a secure connection between the protected service and a metering engine configured to perform the analysis.

8. The computer readable medium of claim 1, wherein requesting permission comprises sending an encrypted message from the protected service in the first runtime area to the metering engine within the second runtime area.

9. The computer readable medium of claim 1, wherein the permission was given, additionally comprising:
executing the protected service; and
returning results of the execution to the application.

10. The computer readable medium of claim 1, wherein the permission was not given, additionally comprising returning notice of failure to execute the protected service to an application that initiated the call.

11. A processor-readable medium comprising processor-executable instructions for metering execution of code, the processor-executable instructions comprising instructions for:
receiving, at a protected service, a call from an application asking for execution of the protected service, wherein the protected service is one of a plurality of protected services which may be called by the application;
requesting authorization to execute the protected service, wherein the authorization request is made from the protected service to a metering engine through a secure transmission layer; and
analyzing, with the metering engine, a service contract in view of meter data to determine if the authorization request to use the protected service by the application should be allowed, wherein the service contract is one of a plurality of service contracts associated with the plurality of protected services, and wherein the analyzing comprises:
referencing, within the metering engine, the service contract, wherein the service contract comprises rules governing operation of the protected service, the rules comprising a number of times the protected service may be executed and a period of time during which the protected service may be executed;

referencing, within the metering engine, a secure store of meter data, wherein the meter data comprises historical data reflecting past operation of the protected service;

using the rules and the meter data to decide the requested authorization; and updating the metering data to reflect the analysis.

12. The processor-readable medium as recited in claim 11, wherein the metering engine operates within a runtime area that is separate from a runtime area within which the protected service operates.

13. The processor-readable medium as recited in claim 11, wherein the analyzing comprises instructions for:

analyzing the service contract using the meter data and identity of the protected service as input to the analysis.

14. The processor-readable medium as recited in claim 11, wherein the metering of code execution is performed in a managed code environment.

15. The processor-readable medium as recited in claim 11, additionally comprising, where the authorization request was allowed, instructions for:

executing the protected service; and returning results of the execution to the application.

16. The processor-readable medium as recited in claim 11, additionally comprising, where the authorization request was not allowed, instructions for returning notice of failure to execute to the application.

17. The processor-readable medium as recited in claim 11, comprising further instructions for protecting communications between the protected service and the metering engine with cryptography.

18. A code-executing device, comprising:

first and second runtime areas with a secure communication channel between them;

a protected service configured to receive a request from an application for execution of the protected service within the first runtime area; and a metering engine, configured to receive the request and to operate within the second runtime area and to return an allowance code or a rejection code in response to the request by applying rules to meter data, wherein the metering engine comprises:

an enforcement engine, configured for secure communication with the protected service;

a service contract, configured to supply the rules governing operation of the protected service, to the enforcement engine; and a secure store, within which the meter data is contained, wherein the secure store is configured to supply, to the enforcement engine, historical data reflecting past operation of the protected service.

19. The code-executing device of claim 18, wherein the metering engine is configured to:

use identity of the protected service and data from the secure store of meter data as input to an analysis providing return of the allowance code or the rejection code; and update the secure store of meter data to reflect the analysis.

20. The code-executing device of claim 18, wherein the code-executing device is a cellular telephone.

21. The code-executing device of claim 18, wherein the code-executing device is configured for use within a managed code environment.

22. The code-executing device of claim 18, wherein the code-executing device is a compound device, and wherein the protected service is contained on a first portion of the compound device and the metering engine is contained on a second portion of the compound device, and wherein the first portion of the compound device is remotely located from the second portion of the compound device.

23. The code-executing device of claim 18, additionally comprising a library of protected services, within which the protected service is contained.

24. The code-executing device of claim 18, additionally comprising a library of applications, within which the application is contained.

25. A computer readable medium comprising instructions for operating a managed code environment, the instructions comprising:

an application configured to consume services from a library of protected services a protected service, within the library of protected services, configured to receive a request from the application for execution; and a metering engine, configured to return of an allowance code or a rejection code to the request based on rules governing operation of the protected service, wherein the metering engine comprises:

an enforcement engine, configured for secure communication with The protected service:

a service contract, configured to supply the rules governing operation of the protected service, to the enforcement engine; and a secure store, within which the meter data is contained, wherein the secure store is configured to supply, to the enforcement engine, historical data reflecting past operation of the protected service.

26. The computer readable medium of claim 25, wherein the protected service and the metering engine operate within different runtime areas.

27. The computer readable medium of claim 25, wherein the enforcement engine is configured to return of the allowance code or the rejection code by:

analyzing the service contract using identity of the application, identity of The protected service and data from the secure store of meter data as input to the analysis; and updating the secure store of meter data to reflect the analysis.

28. A code-executing device for metering execution of code, the code-executing device comprising:

means for calling a protected service from an application;

means for calling a metering engine from the protected service; and means for analyzing a contract to determine whether to allow or prohibit use of the protected service by the application, wherein the analyzing comprises:

referencing, within the metering engine, a service contract comprising rules governing operation of the protected service;

referencing, within the metering engine, a secure store of meter data, wherein the meter data comprises historical data reflecting past operation of the protected service;

using the rules and the meter data to decide the requested permission; and updating the metering data to reflect the analysis.

29. The code-executing device as recited in claim 28, additionally comprising, where allowance was determined to be appropriate:

means, defined in the protective service, for executing functionality requested by the application; and means for returning results of the execution to the application.

30. The code-executing device as recited in claim 28, additionally comprising, where rejection was determined to be appropriate, means for returning notice of the rejection to the application.

31. The code-executing device as recited in claim 28, wherein the means for analyzing the contract comprises:
    means for analyzing the contract using identity of the application, identity of the protected service, rules within the contract, and data from a secure store of meter data as input to the analysis.

32. The code-executing device as recited in claim 28, wherein the means for calling the metering engine comprises:
    means for opening a secure connection between the protected service and the metering engine; and
    means for operating the protected service and the metering engine within distinct runtime areas.

33. The code-executing device as recited in claim 28, wherein the metering is performed in a managed code environment.

* * * * *

UNITED STATES PATENT AND TRADEMARK OFFICE
CERTIFICATE OF CORRECTION

PATENT NO. : 7,500,108 B2
APPLICATION NO. : 10/791208
DATED : March 3, 2009
INVENTOR(S) : Bruce E. Johnson et al.

Page 1 of 1

It is certified that error appears in the above-identified patent and that said Letters Patent is hereby corrected as shown below:

In column 10, line 16, in Claim 25, after "services" insert -- ; --.

In column 10, line 25, in Claim 25, delete "The" and insert -- the --, therefor.

In column 10, line 25, in Claim 25, delete "service:" and insert -- service; --, therefor.

In column 10, line 40, in Claim 27, delete "The" and insert -- the --, therefor.

In column 10, line 40, in Claim 27, after "services" insert -- , --.

Signed and Sealed this
Third Day of May, 2011

David J. Kappos
*Director of the United States Patent and Trademark Office*